Aug. 11, 1959  D. B. SAVORY  2,899,649
CONTROL APPARATUS
Filed April 29, 1957  2 Sheets-Sheet 1

Inventor:
David B. Savory
by Robert F. Peck
His Attorney

US United States Patent Office 2,899,649
Patented Aug. 11, 1959

2,899,649

CONTROL APPARATUS

David B. Savory, Marblehead, Mass., assignor to General Electric Company, a corporation of New York Application April 29, 1957, Serial No. 655,595

9 Claims. (Cl. 331—172)

This invention relates generally to control apparatus and more particularly to control apparatus in which the oscillatory condition of an electronic oscillator is varied to effect a control operation.

Such controllers are well known in the art and are used extensively as pyrometer controllers to control a wide variety of heating processes; in addition, such controllers may also be used for the measurement and control of other variable conditions, such as speed, vacuum, density, and electrical quantities. A typical form of such controllers is shown in U.S. Patent No. 2,584,728, issued February 5, 1956, to P. C. Michel, and assigned to the same assignee to which the present invention has been assigned, and upon reference to this patent it is seen that a relay in the output circuit of the oscillator may be selectively controlled by changing the oscillatory condition of the oscillator in accordance with changes in a condition being measured. Such change in oscillatory condition is brought about by the movement of a metallic vane relative to a pair of closely spaced inductively coupled sensing coils whereby one oscillatory condition will be established whenever the vane is not between the coils and another oscillatory condition will be established when the vane is between the coils.

The two oscillatory conditions establish different levels of current in the output circuit of the oscillator and this difference in current may be utilized to control a relay which in turn can control suitable process regulating devices.

In applying such a controller to an industrial furnace, a thermocouple is usually arranged to respond to furnace temperature and its millivolt output is coupled to a suitable D'Arsonval millivoltmeter whereby the instrument pointer moves in response to temperature changes. The pointer carries the metallic vane and the sensing coils associated therewith may be mounted in a suitable set-pointer for positioning at the desired furnace temperature, as indicated by the scale of the millivoltmeter.

With such an arrangement, the vane is downscale from the sensing coils when the furnace is cold or when it is coming up to the desired temperature, and being downscale, it is wholly outside of the air-gap between the coils. The oscillatory condition established under these circumstances will maintain the supply of heat to the furnace. When the furnace approaches the desired temperature, the millivoltmeter will bring the vane between the sensing coils, at which position the oscillatory condition of the oscillator will be changed, upon which a relay or other device responsive to such change will function to interrupt the supply of heat to the furnace. So long as the vane stays between the coils, no further heat will be supplied to the furnace, but as the furnace cools and its temperature drops, the vane will move away from the coils, causing the oscillator to revert to its initial oscillatory condition whereby the associated relay will respond to restore the supply of heat to the furnace.

Thus, the controller functions as an On-Off device, responding solely to the position of the vane for its control action.

The aforesaid On-Off action, derived from the type of oscillator controller under discussion, is satisfactory for many processes, but there are some applications for these controllers where the On-Off action does not provide sufficiently close control of the associated process.

For example, in the control of processes having small capacity, rapid heating rates or large process lags, it is desirable to provide, if at all possible, essentially straight-line control, not only for the purpose of controlling with precision the temperature of the process, but to minimize excessive overshooting that can easily result when the control is simple On-Off action.

Examples of processes requiring straight-line control thereof are plastic injection molding equipment, heat treating furnaces and small ovens.

There have been attempts made to provide such straight-line control by the use of modified oscillator controllers having a proportional band centered about the set-point for control action. Such devices usually involve a time proportioning action of the controller which produces a cyclic On-Off action within the proportioning band. It might be said that such controllers are refined versions of simple On-Off controllers in that during buildup of furnace temperature in the case of a heat treating furnace, the controller will be On throughout the buildup period and when the temperature approaches the set-point of the process, the controller will function to interrupt or shut off the heating supply but then will repeat the On-Off cycle continuously over short periods of time until a reasonably stable condition of operation is reached.

Such modified controllers may be looked upon as anticipating devices in that when the set-point of the process is approached, the controller will function somewhat ahead of the set-point to shunt off the heat in the case of a furnace to anticipate eventual shut-off or reduction of heat for stable operation at the set-point. The cycling occurs after initial shut-off and the anticipating action can be set to occur over short periods of time so that overshooting is minimized and a substantially straight-line control action is realized.

Such modified devices have heretofore been costly and complicated in that they utilized a variety of mechanically operating accessories functioning along with the oscillator to produce the desired control action. For example, such oscillators have been coupled with auxiliary heaters which function to control the action of bimetal contact devices to achieve the cyclic control desired. Another form has utilized auxiliary heaters with temperature sensitive resistors to produce the desired results, and in still other instances there have been controllers equipped with auxiliary coil and vane assemblies, motor driven potentiometers and similar arrangements.

All of the above add significantly to the cost of the basic oscillator control unit and in addition, add to its complexity which inherently could lead to increased maintenance and servicing difficulties.

It is therefore a primary object of this invention to provide a modified form of On-Off oscillator controller in which a cycling action is obtained within a proportional band by the addition of simple and inexpensive electrical components to a basic oscillator controller.

It is another object of the invention to provide such a modified form of oscillator controller in which the control of the cycling period is quickly and easily adjusted as desired.

It is yet another object of the invention to provide such a modified form of oscillator controller without the use of auxiliary mechanically operating components.

In brief, the invention comprises the use of a condenser connected into the input circuit of a standard oscillator controller arranged so that it cyclically charges and discharges in response to changes in the oscillatory condition of the controller.

The charging and discharging action modifies the effect of the coil and vane assembly also forming a part of the input circuit and provides excellent straight-line control therewith.

By associating an adjustable resistor with the condenser, the period for cycling the charging and discharging action of the condenser may be varied to accommodate the needs of particular processes within certain predetermined limits.

The invention together with its objects and advantages will be best understood upon reference to the specification set forth below, particularly when taken with the drawings annexed hereto in which.

Figure 1:
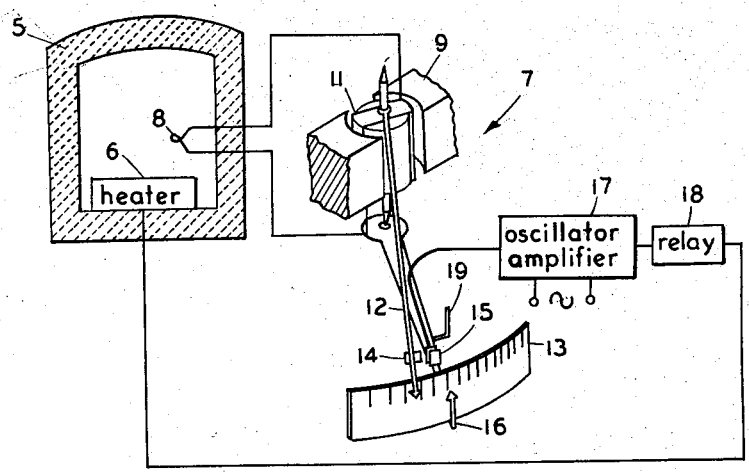
Figure 1 is a substantially schematic arrangement of a controller with an associated electric furnace.

Referring first to Figure 1, there is shown in schematic form a furnace 5 which contains an electric heating unit 6 adapted to be controlled by the oscillator controller 7 which senses the temperature within the furnace through a detector in the form of thermocouple 8.

The thermocouple is connected to a suitable millivoltmeter, part of which is shown at 9, which may be of the high resistance, permanent magnet, moving coil type. The millivolt output of the thermocouple causes deflection of the moving coil 11 forming a part of the millivoltmeter and as the coil moves, it carries an associated pointer 12 across a suitable indicating scale 13. Secured to the pointer 12 near its outer end is a metallic vane 14 which is adapted to cooperate with a pair of spaced sensing coils shown at 15 mounted on a pivotally mounted set-point adjusting arm 16.

The coil and vane assembly may be of the type shown and described in the aforesaid Michel patent and comprises a pair of serially connected, flat, spirally wound pancake coils arranged side by side with a space between on a suitable supporting structure. The coils are thus inductively related to each other such that the insertion of the vane 14, which may be of any suitable electrically conducting material such as copper, will reduce the mutual inductance between the coils and also reduce their self inductane.

This effect is utilized to control the action of the oscillator amplifier 17 which in turn will control the action of a relay 18 which, as shown in Figure 1, will control the action of heater 6.

Positioning of the set-pointer 16 along the scale 13 will enable the temperature of the furnace to be established within any predetermined limits and the action of the coil and vane assembly, together with the oscillator amplifier, will serve to control the temperature of the furnace at the set-point of the control unit.

A pointer stop 19 is shown to prevent the vane 14 from going beyond the space between the coil assembly 15.

Figure 2:
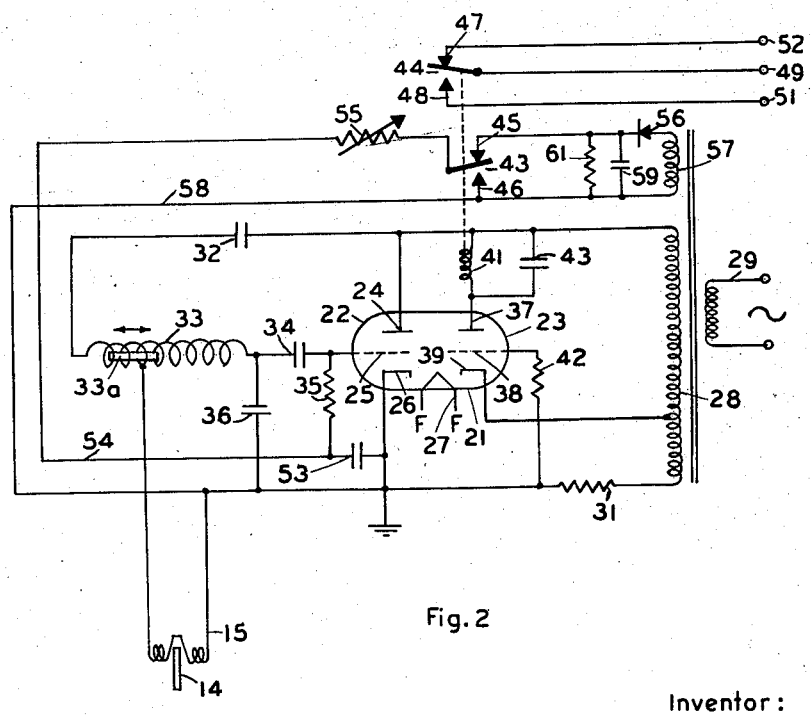
Figure 2 is a circuit diagram of the improved oscillator controller.

The action of the oscillator will be best understood upon reference to Figure 2 wherein there is shown a twin triode 21 comprising an oscillating half 22 and a repeater or amplifier half 23.

Considering first the oscillator portion of the twin triode, it is seen that it has a plate 24, a grid 25 and a cathode 26, together with a suitable filament 27 which may be used to heat both cathodes within the tube.

The oscillator 22 is substantially similar to the oscillator shown in the aforesaid Michel patent and its action will be described but briefly since reference to the patent will afford a complete description of this type of oscillator controller.

Thus, the oscillator has an output circuit which includes the secondary 28 of the A.C. energizing transformer, the primary of which is shown at 29. Also included in the output circuit of oscillator 22 is a resistor 31 across which a predetermined variable voltage drop can be developed in response to changes in the oscillatory condition of the oscillator.

The anode 24 is also connected to the input circuit of the oscillator through a condenser 32 and inductor 33. The plate is connected to one end of the inductor and the other end of the inductor is connected through a grid circuit condenser 34 to the grid 25 of the oscillator. Connected near the plate end of inductor 33 is a lead from the serially connected sensing coils 15 with the other end of the sensing coils connected by a suitable lead to the cathode return of the oscillator. Grid leak resistor 35 is connected between the grid and cathode of the oscillator 22 such that the oscillator is self-biasing, and a condenser 36 is connected across the main portions of inductor 33 via the sensing coils 15 to form the parallel resonant circuit of the oscillator.

As is clearly described in the aforesaid Michel patent, the portion of the inductor 33 between the plate and sensing coils acts as a tickler coil for regenerative feedback and enables the oscillator to develop sustained oscillation as required. It is to be noted that the inductor is provided with an axially adjustable iron core member 33a which is provided to compensate for manufacturing tolerances in order to permit slight adjustments in feedback to allow the pointer 12 to line up properly with the set-point at the stabilized operating condition of the particular process being controlled.

As explained in the Michel patent the sensing coils 15 function as a degenerative feedback coupling which substantially cancels the regenerative feedback when the vane 14 is wholly without the space between the coils such that a low level oscillatory condition is established which allows substantially maximum current in the output circuit of the oscillator. Referring to the process shown in Figure 1, this condition would prevail when the heater is first energized and during the time when the temperature within the furnace is being brought up to the required set-point.

To avail of the current in the load circuit of the oscillator as a means of controlling the heater 6, there is provided the amplifier 23 which has a plate 37, grid 38 and cathode 39. The amplifier 23 is energized from the source 29 through a tapped portion of secondary 28 and its output circuit includes the winding 41 of relay 18. Bias on the grid of the amplifier is derived from a fixed tap on secondary 28, together with the resistor 42 and the voltage drop across resistor 31. A condenser 43 is connected across the relay winding.

When the current in the output circuit of oscillator 22 is at a maximum, which corresponds to an initial oscillatory condition of the oscillator, the voltage drop across resistor 31 is correspondingly at a maximum. Since in the circuit shown the fixed tap in the grid circuit of amplifier 23 develops 30 volts, the resistor 31 is such that with the maximum current of about five milliamperes flowing, its voltage drop is about 32 volts and is of opposite polarity to the fixed voltage derived from the tap on secondary 28. This results in about +2 volts on grid 38 which allows the amplifier 23 to conduct and energize relay winding 41.

Associated with winding 41 are a pair of single-pole, double-throw switches 43, 44, which include the fixed contacts 45, 46, and 47, 48, respectively. The switch 44 may be used to control the heater 6 directly, in which event the movable contact will make with fixed contact 48 to energize the heater which could be connected across the terminals 49, 51. Across terminals 49 and 52 could be a visual or audio indicator so that when the heater unit is de-energized, there would be a suitable indication of such action.

Thus, when the output circuit of the oscillator is drawing maximum current, the switch 44 is closed through its fixed contact 48 to energize heater 6.

Upon increase in furnace temperature, the vane 14 will move until it enters between the coils 15. Upon this occurring, the effect of the degenerative feedback is reduced and the input circuit of the oscillator will develop an increasing negative signal on grid 25 which, upon reaching the appropriate value, will change the oscillatory condition in the oscillator in such a way that a current in the oscillator output circuit will be materially reduced. A much higher level of oscillation will be established at this point and with the drop in current in the load circuit, the voltage drop across resistor 31 will be reduced to about 6 volts. This will place large negative bias on the grid of amplifier 23, causing it to cut off and de-energize relay winding 41. Upon this happening, switch 44 will break through contact 48 and make with contact 47, thereby shutting off the heater and initiating any indicating devices associated with the fixed contact 47.

So far the action described is conventional and conforms with the action of the oscillator controller shown in the aforesaid Michel patent.

To modify this conventional On-Off action, a condenser 53 has been added between the grid leak resistor 35 and cathode 26 of oscillator 22 with the junction of the condenser and grid leak resistor connected through an adjustable resistor 55, switch 43 and rectifier 56 to one side of an auxiliary secondary winding 57 formed as a part of the A.C. power transformer. The other side of winding 57 is connected by lead 58 to cathode 26. Connected across winding 57 is a condenser 59 and resistor 61.

Assuming now that the relay winding 41 has been de-energized at which time the heater is Off, and the switch 43 is closed through its contact 45, the condenser 53 will begin to charge.

Before discussing the effect of the charging action on condenser 53, it would be well to consider the effect on the grid voltage at the oscillator caused by the action of the coil and vane assembly. Thus, as Figure 3 clearly shows, as the vane moves into the coils, the voltage at the grid gradually increases in a negative sense and at −3½ volts, it has reached a magnitude which changes the oscillatory condition of the oscillator which, as said above, causes the relay winding 41 to be de-energized.

Now considering the charging of condenser 53, it is to be noted that the voltage developd across the condenser by reason of the circuit arrangement is in opposition to the negative signal developed at the grid of the oscillator. Thus, as the condenser charges, the negative signal is opposed which results in a reduction in grid voltage shown graphically in Figure 4 by the downward swing of curve A.

Figure 3:
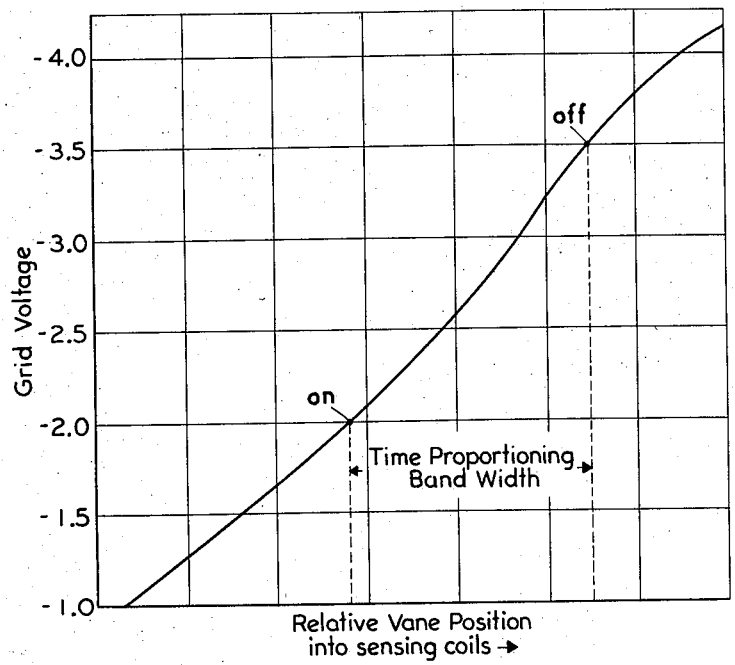
Figure 3 is a graph showing the relationship between oscillator grid voltage and vane position.

Going back to Figure 3, it is to be noted that as the grid voltage at the oscillator decreases, it must fall to −2 volts before the oscillatory condition is changed again to allow increase in the load circuit current for energization of relay 41. In other words, the grid voltage must fall to −2 volts to establish the On condition of the controller.

Figure 4:
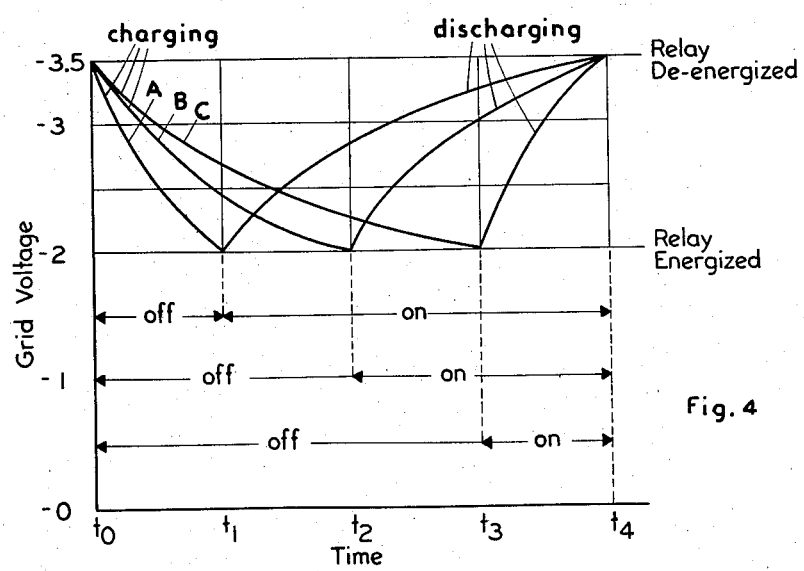
Figure 4 is a graph illustrating the effect on control action derived through the cyclic charging and discharging of the condenser forming a part of the improved controller.

Going back now to Figure 4, it is seen that the effect of charging condenser 53 is to reduce the grid voltage until it reaches −2 volts, at which point the oscillator changes from the Off to the On condition. This may occur over a space of a few seconds during which time there has been no further motion of the vane. In other words, during the charging of the condenser, the signal developed by the relative vane position remains essentially fixed at −3½ volts. Now upon re-energization of winding 41, the heater will be re-energized and the switch 43 will make through fixed contact 46 which allows the condenser 53 to commence discharging. It is to be noted that this change in switch position interrupts the charging circuit to thereby allow the condenser to discharge and as the voltage across the condenser decreases, the voltage at the grid of the oscillator will increase until once again it reaches the −3½ volt level necessary to once again change its oscillatory condition.

This action is shown in Figure 4 by the upward swing of curve A. Thus, considering that the complete cycle for charging and discharging the condenser occurs in a time $T_4$, the curve A clearly shows that after elapse of a time $T_1$ the oscillator changes from the Off to the On position and stays that way until time $T_4$ has elapsed. At time $T_4$ the relay is once again de-energized and the condenser begins to charge again and the cycle thus repeats itself indefinitely, resulting in very close straight-line control of the oscillator.

The curve A corresponds to a position of the vane when it is just entering between the sensing coils. Should the vane penetrate further, the degenerative effect of the sensing coils will be further reduced which will allow an even greater voltage to be developed at the grid of the oscillator. In other words, the grid voltage will exceed the −3½ volts necessary to change the oscillatory condition in the oscillator and having reached a greater negative value, it is obvious that the condenser 53 will have to be charged for a longer time in order to build up sufficient positive voltage in opposition to the negative voltage at the grid in order to reduce the effective voltage at the grid to the −2 volts corresponding to change in oscillatory conditions.

Curve B shows this action and corresponds to a deeper penetration to the vane within sensing coils. Figure 4 graphically shows that whereas for curve A the controller was Off about 25% of the condenser period and On for 75%, for a vane position corresponding to curve B, the oscillator is now Off 50% of the time and On 50% of the time.

If the vane should penetrate to its maximum depth within the sensing coils, the action of the condenser will be as shown in curve C where the charging time is much greater than the discharging time, resulting in about 75% Off and 25% On for the controller.

From the above it is seen that the time proportioning action is achieved by the cyclic charging and discharging of condenser 53 with the ratio of Off-On action during the cycle being controlled by the position of the vane with respect to the sensing coils. In other words, the higher the signal developed at the grid of the oscillator by the operation of the coil and vane assembly, the higher the ratio of charging to discharging of the condenser and the lower the ratio of On to Off for the controller.

With minimum signal developed at the grid by virtue of the operation of the coil and vane assembly, the ratio of charging time to discharging time of the condenser is at a minimum and the controller has a maximum ratio of On-to-Off time.

The period of the condenser is fixed by the magnitude of resistance of resistor 55 and is independent of the vane position. By making resistor 55 adjustable, the period can be varied within limits and it has been found that a range of 3 to 80 seconds is satisfactory for this type of controller.

From the above, it is thus seen that the normal operation of the oscillator controller results in an uninterrupted period when the heater is On during buildup of furnace temperature followed by a fixed cycling between On and Off with the ratio of On and Off varying in accordance with the position of the vane within the sensing coils. This cycling operation occurs over a proportioning band centered about the set-point of the controller and by adjustment of the parameters of resistors 35, 42 and 31 and selection of the proper potential across resistor 61, the band width may be fixed a 5% of full scale. The aforementioned parameters for selection of band width must, of course, be related to the mechanical configuration of the coil and vane assembly for proper operation of the controller, and it is to be understood that these electrical parameters can be varied to accommodate different mechanical configurations of the coil and vane assembly. As shown, the band width is fixed, but it is to be understood that some adjustment in band width could be achieved, if desired, by making the resistor 61 adjustable to selectively control the voltage drop there-across.

Thus, with the use of condenser 53, an extra set of contacts on relay 18, and the rectified auxiliary power source controlled thereby, it is seen that effective and reliable anticipating action can be achieved through a timed proportioning action developed by the cyclic charging and discharging of the condenser. The addition of a variable resistor allows the period of the condenser cycle to be varied in order to allow the controller to be accommodated to a number of different types of processes. Simplicity, reliability, accuracy, ease of adjustment and the complete absense of accessory mechanical devices keynote the invention.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. Control apparatus including an oscillator, said oscillator having an input circuit and an output circuit, first means in said input circuit for varying the oscillatory condition of said oscillator in response to changes in a condition, second means in said input circuit for varying the oscillatory condition of said oscillator, said second means including a condenser arranged to be selectively charged and discharged, a resistor associated with said condenser to fix the period for completing said charging and discharging cycle, and means in said output circuit for controlling the action of said condenser in response to changes in said oscillatory condition.

2. Control apparatus as defined by claim 1 wherein said resistor is adjustable to allow selective variation of said period.

3. Control apparatus including an oscillator, said oscillator having an input circuit and an output circuit, first means in said input circuit for varying the oscillatory condition of said oscillator in response to changes in a condition, second means in said input circuit for varying the oscillatory condition of said oscillator, said second means including a condenser arranged to be selectively charged and discharged, and means in said output circuit for controlling the action of said condenser in response to changes in said oscillatory condition, said condenser charging when said first means functions to establish a first oscillatory condition, said charging continuing until there is established a second oscillatory condition, said condenser discharging when said second oscillatory condition is established, said discharging continuing until said first oscillatory condition is reached.

4. Control apparatus as defined by claim 3 wherein said first means includes a member moving in response to changes in said condition and said condenser has a fixed period for completing its charging and discharging cycle, said period being constant for any position of said member and the ratio of charging time to discharging time varying within said period in accordance with the position of said member.

5. Control apparatus including an oscillator, said oscillator having an input circuit and an output circuit, first means in said input circuit for varying the oscillatory condition of said oscillator in response to changes in a condition, said first means functioning to control the magnitude of a first electrical signal in said input circuit, said first signal having a predetermined magnitude at which said oscillator changes from a first to a second oscillatory condition, second means in said input circuit for varying the oscillatory condition of said oscillator, said second means including a condenser arranged to be cyclically charged and discharged to selectively control the magnitude of a second electrical signal in said input circuit and means in said output circuit for controlling the action of said condenser in response to changes in said oscillatory condition, said condenser charging when said oscillator is in said second oscillatory condition, said second signal opposing said first signal when said condenser is charging to reduce said first signal below said predetermined magnitude whereby said oscillator changes from said second to said first condition, said condenser discharging after said last-named change in oscillatory condition to allow said first signal to increase to said predetermined magnitude at which time said oscillator changes from said second condition back to said first condition.

6. Control apparatus as defined by claim 5 wherein the charging and discharging cycle of said condenser has a period of fixed duration and the magnitude of said first signal controls the ratio of charging time to discharging time within said cycle.

7. Control apparatus as defined by claim 6 wherein said ratio has a maximum value when the magnitude of said first signal is at a maximum value and said ratio has a minimum value when the magnitude of said first signal is at a minimum value.

8. Control apparatus as defined by claim 7 wherein said second means includes an adjustable resistor whereby adjustment thereof allows said condenser period to be varied between maximum and minimum limits.

9. Control apparatus comprising, in combination: an oscillator having an input circuit and an output circuit, first means in said input circuit for varying the oscillatory condition of said oscillator in response to changes in a condition, second means in said input circuit for varying the oscillatory condition of said oscillator, said second means including a condenser arranged to be selectively charged and discharged, and means in said output circuit for controlling the action of said condenser in response to changes in said oscillatory condition.

References Cited in the file of this patent
UNITED STATES PATENTS

| | | |
|---|---|---|
| 2,154,287 | Schewe | Apr. 11, 1939 |
| 2,778,574 | Moore et al. | Jan. 22, 1957 |